United States Patent Office 3,336,329
Patented Aug. 15, 1967

3,336,329
METAL SALT COMPLEX
Walter Reifschneider, Midland, Mich., assignor to The Dow Chemical Company, Midland, Mich., a corporation of Delaware
No Drawing. Filed Mar. 11, 1966, Ser. No. 533,420
8 Claims. (Cl. 260—299)

The present invention is concerned with organic chemistry and is directed to a complex of (A) a benzothiazolium compound of the formula

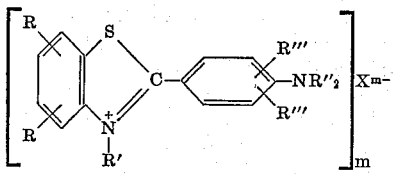

and (B) a metal salt compound. In the above and succeeding formulae, X represents a pharmaceutically acceptable anion; each R independently represents a member selected from the group consisting of hydrogen, loweralkyl, loweralkoxy, bromo, and chloro; R' represents primary loweralkyl; each R'' independently represents a member selected from the group consisting of hydrogen and primary loweralkyl; each R''' independently represents a member selected from the group consisting of hydrogen, chloro, methoxy, and methyl; and $m$ represents an integer equal to the valence of the anion X. The term "metal salt complex" is employed in the present specification and claims to designate a product or products of the foregoing definition only.

In the present specification and claims, the unmodified term "loweralkyl" and the term "loweralkoxy" are employed to designate alkyl and alkoxy, respectively, radicals being of from 1 to 4, both inclusive, carbon atoms; the term "halide" is employed to designate chloride, bromide, and iodide, only; and the term "primary loweralkyl" is employed to designate an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. In the present specification and claims, the term "metal salt compound" is employed only to designate a compound of the formula $M_aY_b$ wherein M represents a member selected from the group consisting of copper(+), copper(++), iron(++), iron(+++), antimony(+++), bismuth(+++), tin(++), manganese(++), zinc(++), and cadmium(++); Y represents a pharmaceutically acceptable anion; and each of $a$ and $b$ represents an integer such that ($a$ times the valence of M) is equal to ($b$ times the valence of Y).

Generally, the present complex of benzothiazolium compound and metal salt compound exists as a 1:1 complex, that is, one molecule of benzothiazolium compound and one molecule of metal salt compound; as a 2:1 complex, that is, two molecules of benzothiazolium compound and one molecule of metal salt compound; or as a 1:2 complex, that is, two molecules of metal salt compound and one molecule of benzothiazolium compound. In this description, as generally throughout the present specification, the term "benzothiazolium compound" designates the entire compound described foregoing as (A) and having $m$ units of the positive benzothiazolium radical; hence a 1:1 complex comprises more than one positive benzothiazolium radical wherever $m$ represents an integer in excess of 1.

Each of the units which constitute the ultimate metal salt complex of the present invention, that is, (A) the benzothiazolium compound unit and (B) the metal salt compound unit, comprises an anion. These anions are interchangeable. Therefore, in an alternate expression, the complex of the present invention can be described as being of the following structural formula

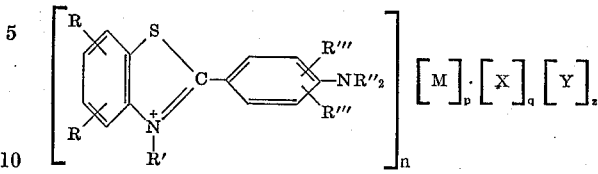

in which each of $n$, $p$, $q$, and $z$ is an integer and $[n+(p$ times the valence of M$)]$ is equal to the value of $[(q$ times the valence of X$)+(z$ times the valence of Y$)]$. In a preferred embodiment of the present invention, the anions X and Y are identical.

The primary attribute of the pharmaceutically acceptable anion (X and Y) is nontoxicity. The choice of the anion is not critical, although a given anion may in some instances exhibit special advantages, due to solubility, ease of crystallization, lack of objectionable taste and the like. Representative pharmaceutically acceptable anion moieties include the following: chloride, bromide, iodide, sulfate, bisulfate, acetate, salicylate, valerate, oleate, phenate, laurate, borate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, cinnamate, stearate, and the like.

Hence, representative metal salt complexes of the present invention are those of a given benzothiazolium compound and each of the following metal salt compounds:

Antimony acetate, antimony trichloride, antimony tribromide, antimony triiodide, antimony sulfate, antimony tartrate, bismuth acetate, bismuth benzoate, bismuth tribromide, bismuth trichloride, bismuth citrate, bismuth triiodide, bismuth lactate, bismuth salicylate, bismuth sulfate, bismuth tartrate, cupric acetate, cuprous acetate, cupric benzoate, cuprous bromide, cupric bromide, cupric butyrate, cuprous chloride, cupric chloride, cupric citrate, cupric formate, cupric glyceride, cupric lactate, cupric laurate, cupric oleate, cupric salicylate, cupric stearate, cuprous sulfate, cupric sulfate, cuprous sulfite, cupric tartrate, ferrous acetate, ferric acetate, ferric benzoate, ferrous bromide, ferric bromide, ferrous carbonate, ferrous chloride, ferric chloride, ferric citrate, ferric formate, ferrous iodide, ferrous lactate, ferric lactate, ferric malate, ferric oleate, ferrous sulfate, ferric sulfate, ferrous tartrate, manganese acetate, manganese benzoate, manganese bromide, manganese chloride, manganese citrate, manganese formate, manganese iodide, manganese lactate, manganese orthophosphate, manganese metasilicate, manganese sulfate, manganese tartrate, manganese valerate, stannous acetate, stannous bromide, stannous chloride, stannous chromate, stannous iodide, stannous orthophosphate, stannous sulfate, stannous tartrate, zinc acetate, zinc aluminate, zinc benzoate, zinc borate, zinc bromide, zinc butyrate, zinc caproate, zinc carbonate, zinc chloride, zinc chromate, zinc citrate, zinc formate, zinc iodide, zinc lactate, zinc laurate, zinc oleate, zinc salicylate, zinc stearate, zinc sulfate, zinc sulfite, and zinc tartrate.

The complex of the present invention can exist as a hydrate, ordinarily as a hemihydrate, monohydrate, or dihydrate, and it is frequently convenient to prepare and separate a given product of the present invention as a hydrate. Sometimes the hydrate contains a higher proportion of water per molecule of complex, such as 2 to 10 moles of water per mole of complex. Also, the products of the present invention, particularly those in which either or both of X any Y represent a halogen atom, sometimes exist at least initially as a hydrohalide addition salt at the site of the para amino nitrogen. However, these hydrohalide salts readily dehydrohalogenate upon recrystallization or even merely upon standing. Because of this instability, their use is not generally preferred. However, regardless of the ratio of complex of benzothiazolium compound and metal salt compound, or of the existence of the complex as a hydrate or hydrohalide addition salt, all products of the present invention share similar properties and are prepared by the same synthetic methods hereinbelow taught.

The products of the present invention are crystalline solid materials. They are prepared by reacting together the benzothiazolium compound, as previously defined as being of the formula

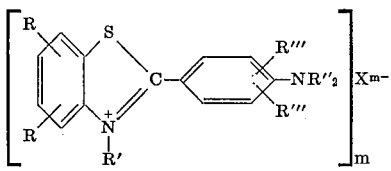

or its hydrate, with the metal salt compound, also as previously defined.

The reaction is conveniently carried out by contacting the reactants in an inert liquid reaction medium. Preferably, an organic liquid is employed as inert liquid reaction medium. Suitable reaction media include water; the loweralkanols, such as methanol, ethanol, and isopropanol; and the loweralkyl ketones, such as acetone and methyl ethyl ketone.

The reaction goes forward under temperatures of a wide range, but is preferably carried out at temperatures of from about 20° C. to the boiling temperature of the reaction medium employed. The reaction can be conducted under pressures which are subatmospheric or superatmospheric, but no advantage is thereby gained; therefore, the reaction is ordinarily conducted at atmospheric pressures.

The reaction proceeds with the production of some of the desired product when the reactants are employed in any amounts. When it is desired to prepare a product in which the complex is of a given ratio, it is preferred to employ the reactants in approximately those amounts which are consumed in the preparation of the given ratio of complex, or in amounts which represent a slight excess of metal salt compound. In the instance of a 1:1 complex, equimolecular proportions of the reactants are consumed. In the instance of a 1:2 complex, one molecular proportion of benzothiazolium compound and two molecular proportions of metal salt compound are consumed; and in the instance of a 2:1 complex, one molecular proportion of metal salt compound and two molecular proportions of benzothiazolium compound are consumed.

In carrying out the reaction, the reactants are mixed and contacted together in any manner, conveniently by adding one reactant to the other reactant. Thereafter, the resulting reaction mixture can be maintained for a period of time in the reaction temperature range to complete the reaction, although the reaction ordinarily goes to completion with the completion of the contacting together of the reactants. The product appears as a precipitate in the reaction mixture. This product can be separated by filtration or decantation. If desired, the separated product can be purified by washing with inert liquid reaction medium or by recrystallization.

Most of the complexes of the present invention form hydrates upon even brief contact with water. However, when it is desired to obtain a hydrate form of any complex which is not initially hydrated, such hydrate is prepared by mixing the complex with water, permitting the mixture to stand for a period of time, and separating the resulting hydrate, or by exposing the complex to moist atmosphere over a period of time. When it is desired to employ as active agent a complex which is not a hydrate, the corresponding complex hydrate is dehydrated by any of the known dehydration procedures, such as oven-drying, drying in the presence of a desiccating agent, and the like.

The following examples illustrate the best manner now known for the practicing of the present invention, and will enable those skilled in the art to practice the present invention.

*Example 1.—2-(p-dimethylaminophenyl) - 3,6-dimethylbenzothiazolium chloride 1:1 complex with zinc chloride*

2-(p-dimethylaminophenyl) - 3,6-dimethylbenzothiazolium chloride (520 grams; 1.6 moles) was dissolved in 3.5 liter of methanol and the resulting solution heated to boiling temperature. A second solution of 350 grams of zinc chloride of a 97 percent purity (2.5 moles of the zinc chloride) in 1.5 liters of methanol was prepared and heated. Thereafter, the second solution was added to the first solution and the resulting reaction mixture permitted to cool to room temperature. During the addition and subsequent cooling, the desired 2-(p-dimethylaminophenyl)-3,6-dimethylbenzothiazolium chloride 1:1 complex with zinc chloride precipitated in the reaction mixture. The product precipitate was separated from the reaction mixture by filtration, the separated product washed with methanol, and the washed product air-dried. The product, which exists as a dihydrate, is a yellow crystalline solid melting with decomposition at 226–228° C. Elemental analysis of the product was made. Found: C, 41.45 percent; H, 4.99 percent; Cl, 21.16; N, 5.62 percent. Calculated for $C_{17}H_{19}Cl_3N_2SZn \cdot 2H_2O$: C, 41.57 percent; H, 4.72 percent; Cl, 21.66 percent; N, 5.70 percent.

*Example 2.—2-(p-dimethylaminophenyl) - 3,6-dimethylbenzothiazolium chloride 1:1 complex with cupric chloride*

2-(p-dimethylaminophenyl) - 3,6-dimethylbenzothiazolium chloride (25 grams; about 0.083 mole) was dissolved in 100 milliliters of n-butanol, and the resulting solution heated to boiling temperature. A second solution of 14 grams of cupric chloride dihydrate (about 0.082 mole) in 120 milliliters of n-butanol was prepared and heated. Thereafter, the second solution was added to the first solution, and the resulting reaction mixture permitted to cool to room temperature. During the cooling, the 2-(p-dimethylaminophenyl)-3,6-dimethylbenzothiazolium chloride 1:1 cupric chloride complex precipitated in the reaction mixture. The product precipitate was separated from the reaction mixture by filtration, the separated product washed with n-butanol, and the washed product air-dried. The product, which exists as a hemihydrate, is a crystalline solid melting with decomposition at 173–175° C.

In view of the foregoing teachings and examples, those skilled in the art will be enabled to prepare all of the products of the present invention. Representative products include the following:

From 2-(p-dimethylaminophenyl)-3,6-dimethyl-benzothiazolium bromide and cupric bromide, 2-(p-dimethylaminophenyl)-3,6-dimethylbenzothiazolium bromide 2:1 complex with cupric bromide, melting with decomposition at 189–190° C.

Elemental analysis of the product was made. Found: C, 43.00 percent; H, 4.02 percent; Br, 33.75 percent; N, 5.85 percent. Calculated for $C_{34}H_{38}Br_4CuN_4S_2$: C, 42.98 percent; H, 4.03 percent; Br, 33.65 percent; N, 5.90 percent.

From 2-(p-dimethylaminophenyl) - 6-chloro-3-methylmethylbenzothiazolium iodide and cuprous iodide, 2-(p-dimethylaminophenyl) - 6-chloro - 3-methylbenzothiazolium iodide 1:1 complex with cuprous iodide, having a molecular weight of 621.2.

From 2-(p-dimethylaminophenyl)-3,6-dimethyl-benzothiazolium chloride and zinc sulfate, a product described, upon analysis, as having the following structural formula:

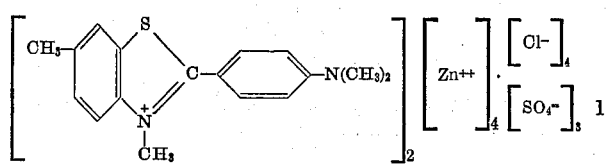

The product, a yellow crystalline solid, melts with decomposition at 270–273° C.

From 2 - (p-dimethylaminophenyl) - 3,6 - dimethylbenzothiazolium chloride and ferrous chloride, 2-(p-dimethylaminophenyl) - 3,6 - dimethylbenzothiazolium chloride 2:1 complex with ferrous chloride dihydrate, melting with decomposition at 216–218° C.

Elemental analysis was made. Found: C, 51.05 percent; H, 5.30 percent; Cl, 18.20 percent; N, 7.18 percent. Calculated for $C_{34}H_{38}Cl_4FeN_4S_2 \cdot 2H_2O$: C, 51.01 percent; H, 5.29 percent; Cl, 17.72 percent; N, 7.00 percent.

From 2-(p-dimethylaminophenyl) - 3 - methylbenzothiazolium iodide and bismuth iodide, 2-(p-dimethylaminophenyl)-3-methylbenzothiazolium iodide 1:1 complex with bismuth iodide, having a molecular weight of 986.

From 2 - (p-dimethylaminophenyl)-3,6-dimethylbenzothiazolium chloride and bismuth chloride, 2-(p-dimethylaminophenyl - 3,6 - dimethylbenzothiazolium chloride 1:1 complex with bismuth chloride, melting with decomposition at 280–282° C.

From 2 - (4-diethylamino-3-chlorophenyl)-3-methylbenzothiazolium salicylate and bismuth salicylate, 2-(4-diethylamino - 3 - chlorophenyl)3-methylbenzothiazolium salicylate 1:1 complex with bismuth salicylate, having a molecular weight of 1089.4.

From 2-(p-dimethylaminophenyl) - 3,6 - dimethylbenzothiazolium chloride and antimony trichloride, 2-(p-dimethylaminophenyl) - 3,6 - dimethylbenzothiazolium chloride 1:1 complex with antimony trichloride, melting with decomposition at 221–223° C.

From 2 - (4 - dimethylamino-m-tolyl)-3-methylbenzothiazolium valerate and manganese valerate, 2-(4-dimethylamino-m-tolyl)-3-methylbenzothiazolium valerate 1:1 complex with manganese valerate, having a molecular weight of 641.7.

From 2 - (p - dimethylaminophenyl - 3,6 - dimethylbenzothiazolium bromide and cuprous bromide, 2-(p-dimethylaminophenyl - 3,6 - dimethylbenzothiazolium bromide 1:1 complex with cuprous bromide, melting with decomposition at 188–193° C.

From 2 - (p-dimethylaminophenyl)-3,5,6-trimethylbenzothiazolium oleate and ferric oleate, 2-(p-dimethylaminophenyl)-3,5,6-trimethylbenzothiazolium oleate 1:1 complex withe ferric oleate, having a molecular weight of 1479.1.

From 2-(p - dimethylaminophenyl)-3,6-dimethylbenzothiazolium chloride and cadmium chloride, 2-(p-dimethylaminophenyl - 3,6 - dimethylbenzothiazolium chloride 2:1 complex with cadmium chloride monohydrate, melting with decomposition at 231–233° C.

From 2 - (p - dimethylaminophenyl)-3,6-dimethylbenzothiazolium chloride and ferric chloride, 2-(p-dimethylaminophenyl) - 3,6 - dimethylbenzothiazolium chloride 1:1 complex with ferric chloride, melting with decomposition at 183–185° C.

From 2-(p - dimethylaminophenyl) - 3 - ethylbenzothiazolium benzoate and cupric benzoate, 2-(p-dimethylaminophenyl)-3-ethylbenzothiazolium benzoate 1:2 complex with cupric benzoate, having a molecular weight of 655.8.

From 2 - (p - dimethylaminophenyl)-3-methylbenzothiazolium chloride and zinc chloride, 2-(p-dimethylaminophenyl - 3 - methylbenzothiazolium chloride 1:1 complex with zinc chloride monohydrate, melting with decomposition at 225–228° C.

From 2 - (2,5 - dichloro-4-diethylaminophenyl)-3,5,6-trimethylbenzothiazolium lactate and manganese lactate, 2 - (2,5-dichloro-4-diethylaminophenyl)-3,5-6-trimethylbenzothiazolium lactate 1:1 complex with manganese lactate, having a molecular weight of 716.6.

From 2-(p-dimethylaminophenyl) - 3,6 - dimethylbenzothiazolium chloride and manganese chloride, 2-(p-dimethylaminophenyl) - 3,6 - dimethylbenzothiazolium chloride 2:1 complex with manganese chloride monohydrate, melting with decomposition at 238–240° C.

From 2 - (4-di-n-propylamino - 6 - chloro-m-tolyl)-3,6-diethylbenzothiazolium chloride and zinc chloride, 2-(4-di-n-propylamino-6-chloro - m - tolyl)-3,6-diethylbenzothiazolium chloride 1:1 complex with zinc chloride, having a molecular weight of 587.8.

From 2 - (p-dimethylaminophenyl)-3,6-dimethylbenzothiazolium chloride and zinc chloride, 2-(p-dimethylaminophenyl - 3,6 - dimethylbenzothiazolium chloride 2:1 complex with zinc chloride monohydrate, melting with decomposition at 234–235.5° C.

From 2 - (4-di-n-butylamino-3-methoxyphenyl)-6-n-butyl - 4 - chloro-3-n-propylbenzothiazolium formate and cupric formate, 2-(4-di-n-butylamino-3-methoxyphenyl)-6-n-butyl - 4 - chloro-3-n-propylbenzothiazolium formate 1:1 complex with cupric formate, having a molecular weight of 701.8.

From 2 - (p - dimethylaminophenyl)-3,6-dimethylbenzothiazolium bromide and zinc sulfate, 2-(p-dimethylaminophenyl)-3,6-dimethylbenzothiazolium bromide 1:1 complex with zinc sulfate, melting with decomposition at 242–246° C.

From 2 - (p-dimethylaminophenyl - 6 - isopropyl-4-methoxy-3-n-butylbenzothiazolium carbonate and ferric carbonate, 2 - (p - dimethylaminophenyl)-6-isopropyl-4-methoxy-3-n-butylbenzothiazolium carbonate 1:1 complex with ferric carbonate, having a molecular weight of 943.

From 2-(p-dimethylaminophenyl) - 3,6 - dimethylbenzothiazolium bromide and ferrous bromide, 2-(p-dimethylaminophenyl) - 3,6 - dimethylbenzothiazolium bromide 1:1 complex uith ferrous bromide hydrobromide, melting with decomposition at 194–195° C.

Elemental analysis was made. Found: C, 30.9 percent; H, 2.94 percent; Br, 46.50 percent; N, 4.31 percent. Calculated for $C_{17}H_{19}Br_3FeN_2S \cdot HBr$: C, 30.94 percent; H, 3.05 percent; Br. 48.44 percent; N, 4.25 percent.

From 2(4 - ethylamino - 3,5 - xylyl) - 5,6-diethoxy-3-isobutylbenzothiazolium chloride and cuprous chloride, 2 - (4-ethylamino-3,5-xylyl)-5,6-diethoxy-3-isobutylbenzothiazolium chloride 1:1 complex with cuprous chloride, having a molecular weight of 562.1.

From 2 - (p - dimethylaminophenyl) - 3,6 - dimethylbenzothiazolium sulfate and ferrous sulfate, 2-(p-dimethylaminophenyl) - 3,6 - dimethylbenzothiazolium sulfate 1:1 complex with ferrous sulfate monohydrate, melting with decomposition at 238–242° C.

From 2-(p-diisobutylaminophenyl)-6-n-butoxy-3-methylbenzothiazolium chloride and zinc butyrate, 2-(p-diisobutylaminophenyl) - 6-n-butoxy-3-methylbenzothiazolium chloride 1:1 complex with zinc butyrate, having a molecular weight of 701.

From 2 - (p-dimethylaminophenyl)-3,6-dimethylbenzothiazolium bromide and zinc bromide, 2-(p-dimethylaminophenyl)-3,6-dimethylbenzothiazolium bromide 1:1 complex with zinc bromide monohydrate, melting with decomposition at 230–232° C.

From 2-(4-amino-2,5-dimethoxyphenyl)-5,6-dibromo-3-methylbenzothiazolium bromide and stannous bromide, 2 - (4 - amino - 2,5 - dimethoxyphenyl) - 5,6 - dibromo-3-methylbenzothiazolium bromide 1:1 complex with stannous bromide, having a molecular weight of 817.7.

From 2 - (p-dimethylaminophenyl)-3,6-dimethylbenzothiazolium phosphate and stannous phosphate, 2-(p-dimethylaminophenyl) - 3,6-dimethylbenzothiazolium phosphate 1:1 complex with stannous phosphate, having a molecular weight of 1491.3.

From 2 - (p-dimethylaminophenyl)-3,6-dimethylbenzothiazolium chloride and cuprous chloride, 2-(p-dimethylaminophenyl)-3,6-dimethylbenzothiazolium chloride 1:1 complex with cuprous chloride hydrochloride, melting with decomposition at 171.5–173° C.

Elemental analysis was made. Found: C, 45.2 percent; H, 4.35 percent; Cl, 21.26 percent; N, 6.17 percent. Calculated for $C_{17}H_{19}Cl_2CuN_2S \cdot HCl$: C, 44.94 percent; H, 4.44 percent; Cl, 23.41 percent; N, 6.17 percent.

From 2 - (4 - dimethylamino - m - tolyl) - 6-chloro-3,4-dimethylbenzothiazolium formate and manganese formate, 2 - (4-dimethylamino-m-tolyl)-6-chloro-3,4-dimethylbenzothiazolium formate 1:1 complex with manganese formate, having a molecular weight of 522.

From 2 - (p-dimethylaminophenyl)-3,6-dimethylbenzothiazolium acetate and zinc acetate, 2-(p-dimethylaminophenyl)-3,6-dimethylbenzothiazolium acetate 1:1 complex with zinc acetate, melting with decomposition at 229–230° C.

From 2 - (p - diethylaminophenyl)-4,7-dichloro-3-ethylbenzothiazolium iodide and bismuth iodide, 2-(p-diethylaminophenyl)-4,7-dichloro-3-ethylbenzothiazolium iodide 1:1 complex with bismuth iodide, having a molecular weight of 495.3.

From 2 - (p-dimethylaminophenyl)-3,6-dimethylbenzothiazolium chloride and cuprous chloride, 2-(p-dimethylaminophenyl)-3,6-dimethylbenzothiazolium chloride 1:1 complex with cuprous chloride hemihydrate, melting, with decomposition, at 176–178° C.

From 2 - (p - ethylmethylaminophenyl) - 3,6 - dimethylbenzothiazolium acetate and ferrous acetate, 2-(p-ethylmethylaminophenyl)-3,6-dimethylbenzothiazolium acetate 1:1 complex with ferrous acetate, having a molecular weight of 458.4.

From 2 - (p-dimethylaminophenyl)-3,6-dimethylbenzothiazolium chloride and stannous chloride, 2-(p-dimethylaminophenyl)-3,6-dimethylbenzothiazolium chloride 1:1 complex with stannous chloride, melting, with decomposition, at 262–264° C.

The products of the present invention are useful for the control of undesirable aquatic crustaceans such as Daphnia, particularly in bodies of water which have defined boundaries and which are managed with regard to the aquatic life they support. They are also useful as toxic agents to control insects, such as two-spotted spider mites and southern armyworms.

In addition, the products are useful as agents to improve the health of warm-blooded animals. In one embodiment, the products are incorporated in animal feeds; in such usage, the products improve the growth characteristics of the animals generally and, in particular, control organisms which are internal parasites upon the animals. In another embodiment, the control of these parasities can also be achieved by contacting the parasites in their infective phase outside of the host body.

In representative operations, 2-(p-dimethylaminophenyl)-3,6-dimethylbenzothiazolium chloride 1:1 complex with zinc chloride was dispersed in water to prepare an aqueous treating composition containing 2 parts of the subject compound per million parts by weight of ultimate aqueous treating composition. Immediately after the preparation of the composition, Daphnia were placed in the composition for a period of about 24 hours. At the end of the period, the composition was examined to determine the percent kill and control of Daphnia, and it was found that there was a 100 percent kill and control of Daphnia.

The benzothiazolium compound which is employed as a starting material in the preparation of the complexes of the present invention is itself prepared in known procedures. In one such procedure, an aminobenzenethiol compound of the formula

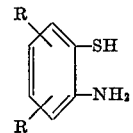

is reacted at temperatures of about 150° C. with an aminobenzene compound of the formula:

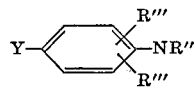

In the aminobenzene compound, Y can be any of numerous acidic functional groups, such as carboxy (—COOH), carbonyl chloride

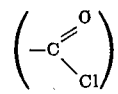

formyl

cyano (—CN), and the like; generally, an aminobenzene reactant wherein Y represents formyl is employed. The reaction goes forward in the presence or absence of an inert liquid reaction medium to prepare a benzothiazole compound of the formula:

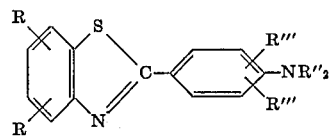

This benzothiazole compound is separated by sublimation, solvent extraction, or recrystallization.

Thereafter, in those starting material wherein each R″ symbol represents primary loweralkyl, the separated benzothiazole compound is quaternized by reaction with an appropriate quaternizing agent, such as a primary loweralkyl halide, diprimary loweralkyl sulfate, or primary loweralkyl ester of p-toluenesulfonic acid. In many instances, the quaternizing agent, particularly the primary loweralkyl halide, is conveniently prepared in situ. For example, the quaternizing agent methyl chloride can be prepared in situ by employing methanol and hydrochloric acid. In the quaternization reaction, it is preferable to employ one equimolar quantity of benzothiazole compound and one or more equimolecular quantities of quaternizing agent. Good results are obtained when the quaternization is conducted at temperatures of from about 100° to about 160° C. Preferably, the quaternization is conducted in an inert liquid reaction medium; in many instances, an excess amount of one of the quaternizing agents or of one of the reagents employed to prepare the quaternizing agent in situ is employed as inert liquid reaction medium. As a result of such quaternization procedures, there is prepared the starting benzothiazolium compound wherein X represents halide, —R′SO₄, or

This benzothiazolium compound is separated from the reaction mixture in any of the conventional separation techniques. For example, benzothiazolium compound sometimes precipitates and is separated by filtration. In other instances, the reaction mixture containing the benzothiazolium compound as a product becomes a solid mass during the course of the reaction, and the reaction product is taken up in, and recrystallized from, a solvent, such as acetone, an alcohol, which can be methanol, ethanol, or isopropanol, or a mixture of such alcohol with another solvent, such as ether or benzene. In yet other instances, the benzothiazolium compound is extracted from the reaction mixture with water, a "salting out agent" added to the resulting aqueous extract to precipitate the product, and the precipitated product separated by filtration. In such procedures, the salting out agent can be any salt having as an anion the desired X moiety. Commonly, sodium or potassium salts are employed as salting out agents. Thus, in this procedure are prepared and separated all of the compounds to be employed as a benzothiazolium starting material in preparing the complexes of the present invention. These compounds are purified, if desired, by conventional procedures, such as recrystallization from solvent.

In another procedure for the preparation of those starting materials wherein each R'' symbol represents primary loweralkyl, a nitrobenzene compound of the formula

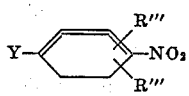

wherein the symbol Y has the same meaning as above defined, is reacted with aminobenzenethiol compound as previously defined to prepare an intermediate compound of the formula:

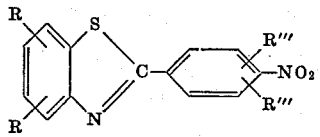

The nitro moiety of this intermediate compound is reduced, in any of various procedures, such as reaction of the compound with iron and hydrochloric acid, to prepare a product of the formula:

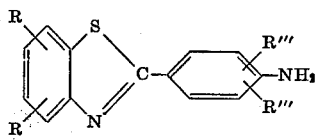

This product is thereafter reacted with an appropriate primary loweralkylating agent, or with two different primary loweralkylating agents simultaneously or successively, to prepare the benzothiazole compound as above defined, which is quaternized and separated in the manner hereinabove discussed to prepare all of the benzothiazolium starting compounds. This procedure is most conveniently employed for only those benzothiazolium compounds wherein both primary loweralkyl groups on the amino nitrogen atom are the same.

Those starting materials wherein at least one R'' symbol represents hydrogen are prepared by a modification of the foregoing procedures. Material of the following formula

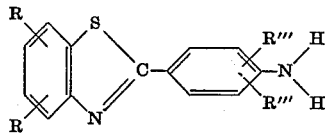

is prepared as taught hereinabove. This material can be reacted with a primary loweralkylating agent as previously described to obtain the corresponding material wherein one of the amino hydrogen atoms is replaced by primary loweralkyl:

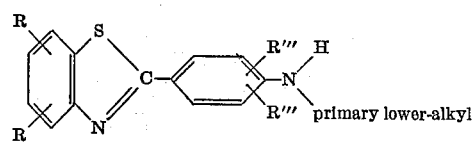

Either material is then reacted with acetic anhydride to obtain a compound in which the amino nitrogen is hindered:

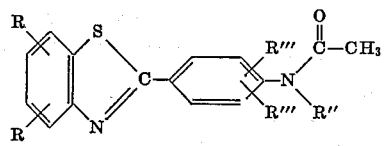

The ring nitrogen of this compound is then quaternized, as discussed foregoing, and the resulting quaternized material reacted with hydrochloric acid to obtain the desired starting material as a chloride

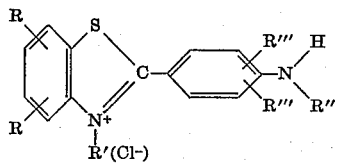

Complexes comprising that benzothiazolium compound which is of the formula

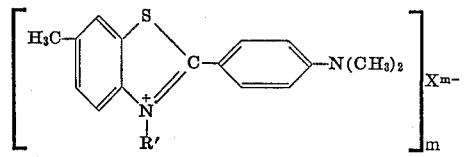

and especially those wherein X represents halide, —HSO$_4$, —R'SO$_4$, —H$_2$PO$_4$,

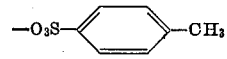

or —O$_3$SCH$_3$, constitute a preferred embodiment because of the directness of their synthesis and because of the exceptional performance of methods and compositions containing them in accordance with the present invention. The benzothiazolium compound in such complexes is conveniently prepared in yet another known procedure. In this procedure, p-toluidine is heated with sulfur, in the proportion of two moles of p-toluidine to 4 or 5 atoms of sulfur and at elevated temperatures such as, about 200° C. As a result, there is prepared a mixture of products, including a product of the formula:

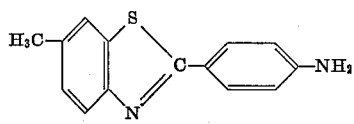

This product is separated from the reaction mixture and from the other products in known procedures and thereafter reacted with a primary loweralkylating agent, and the resulting alkylated benzothiazole product is quaternized according to the procedures hereinabove discussed.

When all R' and R'' moieties in a given benzothiazolium material are the same, it is convenient to conduct the primary loweralkylation and the quaternization steps concurrently. In such procedures, a compound of the formula

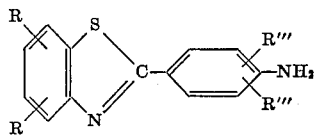

is employed. For example, when all of the R' and R" moieties in a given compound represent —CH₃, the above compound is reacted with methanol and hydrochloric or sulfuric acid at temperatures of about 150°–200° C. Preferably, the reaction is conducted under superatmospheric pressure. When sulfuric acid is employed in this method, the yield of product is increased by supplying to the reaction mixture a small catalytic amount of bromide ion, in the form of an alkyl or aralkyl bromide or a soluble inorganic bromide.

I claim:
1. Complex of (A) a benzothiazolium compound of the formula

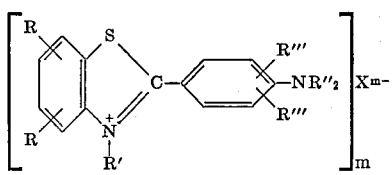

wherein X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen, chloro, methoxy, and methyl; and $m$ represents an integer equal to the valence of the anion X; and (B) a metal salt compound of the formula $$M_aY_b$$

wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that ($a$ times the valence of M) is equal to ($b$ times the valence of Y).

2. The complex of claim 1 which is 2-(p-dimethylaminophenyl)-3,6-dimethylbenzothiazolium chloride 1:1 complex with zinc chloride.

3. The complex of claim 1 which is 2-(p-dimethylaminophenyl)-3,6-dimethylbenzothiazolium chloride 2:1 complex with zinc chloride.

4. The complex of claim 1 which is 2-(p-dimethylaminophenyl)-3,6-dimethylbenzothiazolium chloride 1:1 complex with cuprous chloride.

5. The complex of claim 1 which is 2-(p-dimethylaminophenyl)-3,6-dimethylbenzothiazolium chloride 2:1 complex with ferrous chloride.

6. The complex of claim 1 which is 2-(p-dimethylaminophenyl)-3,6-dimethylbenzothiazolium bromide 1:1 complex with zinc sulfate.

7. The complex of claim 1 which is 2-(p-dimethylaminophenyl)-3,6-dimethylbenzothiazolium acetate 1:1 complex with zinc acetate.

8. The complex of claim 1 which is 2-(p-dimethylaminophenyl)-3,6-dimethylbenzothiazolium chloride 1:1 complex with cupric chloride.

No references cited.

ALEX MAZEL, *Primary Examiner.*
ALTON D. ROLLINS, *Examiner.*